(12) United States Patent
Makartchouk et al.

(10) Patent No.: US 8,173,088 B2
(45) Date of Patent: May 8, 2012

(54) METHOD, SYSTEM AND APPARATUS FOR LIQUID INJECTION INTO A GAS SYSTEM

(75) Inventors: Andrei Makartchouk, Lombard, IL (US); Justin O'Connor, Naperville, IL (US); Steve P. Gravante, Westchester, IL (US); Emad M. Amin, San Diego, CA (US); S. Scott Smith, Powhatan, VA (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 87 days.

(21) Appl. No.: 12/711,436

(22) Filed: Feb. 24, 2010

(65) Prior Publication Data

US 2012/0020854 A1 Jan. 26, 2012

(51) Int. Cl.
*B01D 53/34* (2006.01)
*B01D 53/90* (2006.01)
*B01D 53/94* (2006.01)
*F01N 3/10* (2006.01)

(52) U.S. Cl. ............... 423/213.2; 423/239.1; 60/299; 60/301; 60/302; 60/317

(58) Field of Classification Search ............... 423/213.2, 423/239.1; 40/299, 301, 302, 317
See application file for complete search history.

(56) References Cited

U.S. PATENT DOCUMENTS

| | | | | |
|---|---|---|---|---|
| 2,409,825 A | * | 10/1946 | Baringoltz | 423/213.5 |
| 4,293,524 A | * | 10/1981 | Teller et al. | 422/169 |
| 6,214,305 B1 | * | 4/2001 | van Harderveld et al. | 423/212 |
| 6,382,600 B1 | * | 5/2002 | Mahr | 261/78.2 |
| 2007/0169467 A1 | * | 7/2007 | Shirai et al. | 60/286 |
| 2009/0031717 A1 | * | 2/2009 | Blaisdell | 60/324 |
| 2010/0307134 A1 | * | 12/2010 | Sangiovani | 60/274 |
| 2011/0308234 A1 | * | 12/2011 | De Rudder et al. | 60/295 |
| 2012/0000181 A1 | * | 1/2012 | Gerges | 60/274 |

* cited by examiner

*Primary Examiner* — Timothy Vanoy
(74) *Attorney, Agent, or Firm* — Mark C. Bach; Jeffrey P. Calfa

(57) ABSTRACT

A method for injection reductant into an exhaust gas and for evaporating and decomposing the reductant at an elevated temperature includes providing an exhaust pipe having an interior surface and disposing the pipe in fluid communication with and upstream of a catalyst. The method includes the steps of disposing an internal cone within the pipe generally parallel to the pipe, mounting an injector to the exterior of the pipe in fluid communication with the cone, injecting the reductant into the cone, and directing the exhaust gas in a passage between the interior surface of the pipe and the cone. The exhaust gas is directed within the cone. The flow of exhaust gas has an elevated temperature compared to an ambient. A further step includes creating a drag force on the injected reductant to increase travel time of the injected reductant from the injector to the catalyst.

20 Claims, 2 Drawing Sheets

METHOD, SYSTEM AND APPARATUS FOR LIQUID INJECTION INTO A GAS SYSTEM

FIELD OF THE INVENTION

The present invention relates generally to a method, system and apparatus for injecting an emission liquid reductant into a gas stream, and more particularly, to a method, system and apparatus for injecting an emission reductant, such as urea, into a gas stream of an aftertreatment system, such as an SCR system.

BACKGROUND OF THE INVENTION

Diesel engine combustion results in the formation of nitrogen oxides, ($NO_x$), in the exhaust gas. Typically, urea selective catalytic reduction systems (urea SCR systems) are used to reduce oxides of Nitrogen ($NO_x$) from engines. Nitrogen oxides can be reduced by ammonia, however ammonia is difficult to store. For that reason, urea SCR systems rely on injection of 32.5% aqueous urea solution, which is injected into the exhaust line of a vehicle upstream of an SCR catalyst. In the SCR catalyst, the $NO_x$ is reduced by the ammonia, and the emission from the catalyst is $N_2$, $H_2O$ and $CO_2$.

For efficient performance, the emission reductant, for example urea for SCR systems, must be injected into the engine exhaust gas, evaporized and decomposed before reaching the inlet of the aftertreatment catalyst. The residual time of the evaporation of the reductant depends on the physical properties of the reductant, the injection characteristics, and the energy of the exhaust gas. The heat required for evaporating most reductants is high. For example, a urea solution is injected into the system at an ambient temperature and typically needs to be heated above 150° C. or 200° C. to evaporate the water and decompose the remaining urea into ammonia and isocyanic acid.

When the urea or other reductant is sprayed into the system, the exhaust gas velocity is high, and the exhaust gas stream carries the large droplets at a high velocity to the catalyst. As a result, the residual time of the reductant evaporation is larger than the travel time to the catalyst. If the evaporation and the decomposition are not complete, the SCR catalyst performance is reduced due to insufficient availability of reductant. If the urea solution is not evaporated and decomposed before hitting the inner surface of the exhaust gas pipe, which is at a cooler temperature due to being exposed to the ambient, the urea solution will remain liquid and will not decompose. Further, the urea can form a solid deposit on the inner surface of the exhaust gas pipe.

To facilitate evaporation and decomposition of the reductant, a mixer has been installed in front of the SCR catalyst. Additionally, the reductant injector was placed as far away as possible upstream of the SCR catalyst. However, with larger engines having exhaust gas flow of 170 m3/hour to 1130 m3/hour, the residual time of the reductant evaporation is still larger than the travel time to the catalyst.

SUMMARY OF THE INVENTION

A method for injection of a liquid reductant into an exhaust gas and for evaporating and decomposing the liquid reductant at an elevated temperature includes providing an exhaust pipe having an interior surface and disposing the exhaust pipe in fluid communication with and upstream of a catalyst. The method also includes the steps of disposing an internal cone within the exhaust pipe generally parallel to the exhaust pipe, mounting an injector to the exterior of the exhaust pipe in fluid communication with the internal cone, injecting the liquid reductant into the internal cone, and directing the exhaust gas in a passage between the interior surface of the exhaust pipe and the internal cone. The exhaust gas is also directed within the internal cone. The flow of exhaust gas has an elevated temperature compared to an ambient. A further step includes creating a drag force on the injected liquid reductant to increase the travel time of the injected liquid reductant from the injector to the catalyst.

DESCRIPTION OF A PREFERRED EMBODIMENT

While the following description will describe one application of the present and method, system and apparatus, it should be appreciated that the present method, system and apparatus is applicable to any liquid reductant into any gas stream. The following will describe the present method, system and apparatus with respect to injecting urea, a liquid reductant, into the gas stream of an SCR system. When an engine combusts diesel, nitrogen oxides form in the flame, and are released with the exhaust gas. Nitrogen oxides, $No_x$, are a pollutant that are reduced in SCR systems by ammonia, $NH_3$, resulting in the emission of less harmful nitrogen, $N_2$, water, $H_2O$, and carbon dioxide, $CO_2$.

Ammonia is formed when urea decomposes as it is sprayed into a hot exhaust gas mixture in the exhaust pipe. The urea SCR systems rely on injection of 32.5% aqueous urea solution into the exhaust line of a vehicle upstream of an SCR catalyst, where the temperature of the exhaust gases is preferably in the range of about 130 to 700° C., with the minimum limit of about 130 to 200° C., and more preferably at least about 150° C. for the urea decomposition to occur. If the urea solution is not evaporated and decomposed soon after leaving the injection nozzle, the urea will hit the interior surface of the exhaust pipe. Since the pipe is usually colder than the exhaust gas, the urea will not decompose, and upon evaporation of water, will form a solid deposit on the interior surface of the exhaust pipe. Solid urea deposition can decrease the flow area of the exhaust pipe, resulting in an increased pressure drop and higher exhaust gas velocity in the pipe, which can in turn, result in urea deposition at the downstream catalyst.

Figure 1:
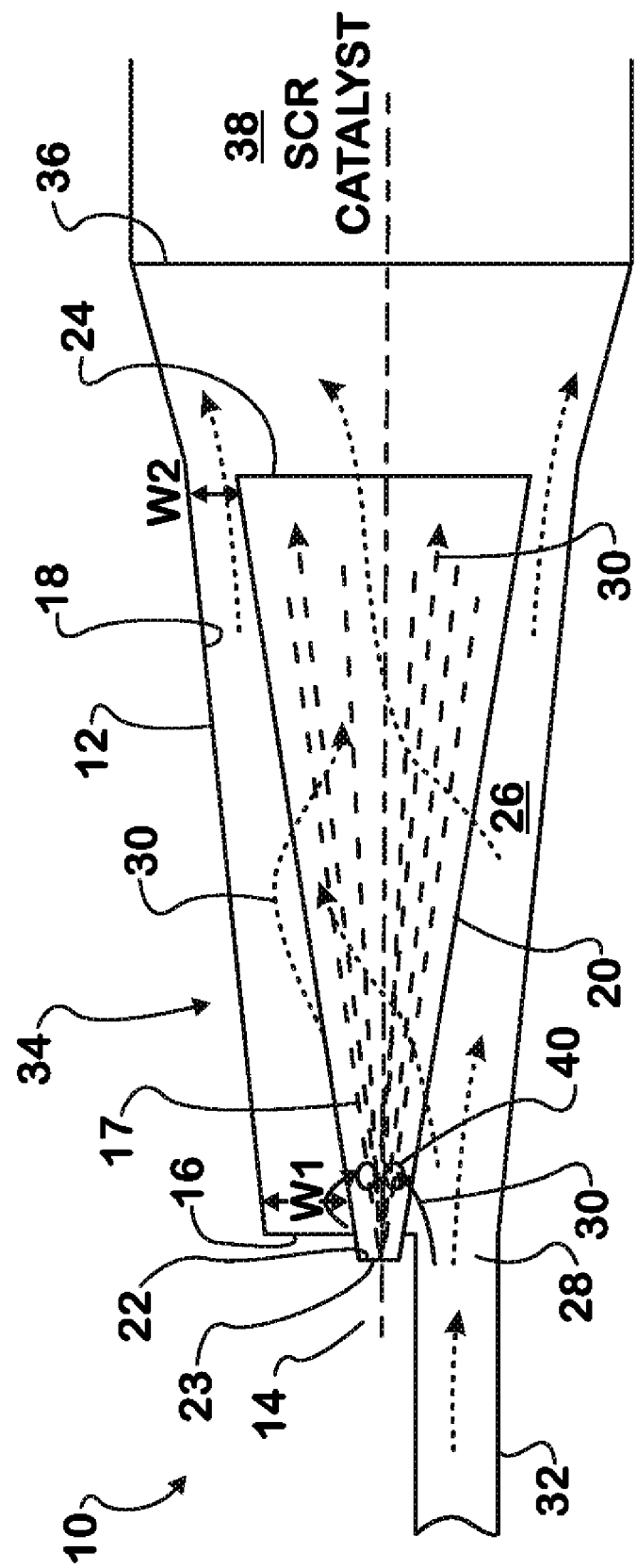
FIG. 1 is a schematic of an internal cone in an exhaust pipe of an aftertreatment system in accordance with the invention.
Figure 2:
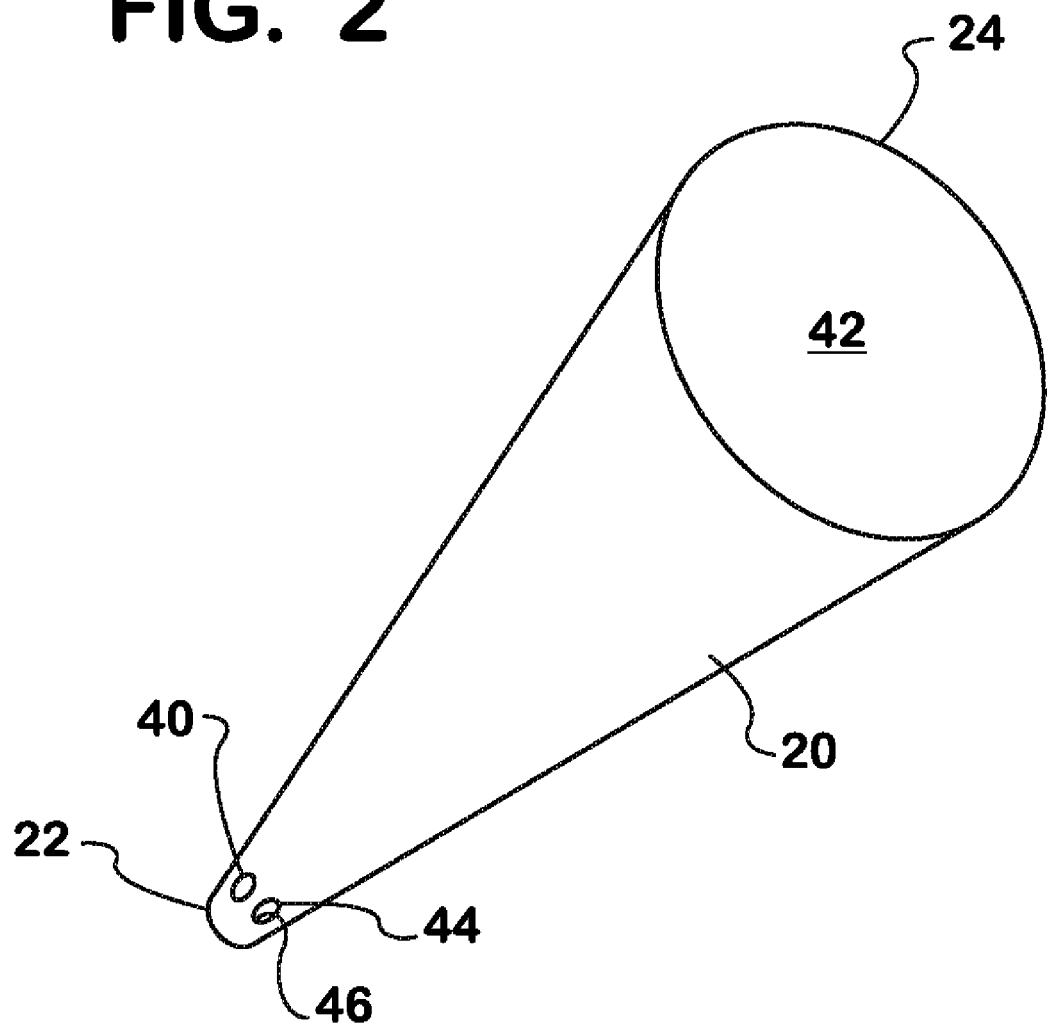
FIG. 2 is a perspective view of the internal cone in accordance with the invention.

Referring to FIG. 1 to FIG. 2, an SCR system (or other aftertreatment system), indicated generally as 10, has an exhaust pipe 12 and an injector 14 mounted at an upstream end 16 of the exhaust pipe such that the sprayed urea or other reductant 17 is in fluid communication with the exhaust pipe. Inside the exhaust pipe 12, and spaced from an interior surface 18 of the exhaust pipe, is an internal cone 20. The internal cone 20 has an upstream end 22 installed around the tip of a nozzle 23 of the injector 14, and a downstream end 24 opposite from the upstream end. The upstream end 22 is advantageously sealed around the nozzle 23 of the injector 14. The downstream end 24 is in fluid communication with the exhaust pipe 12.

The exhaust gas pipe 12 is also generally cone-shaped, forming a passage 26 around the internal cone 20 that is generally concentric with the internal cone. The centerline of the exhaust gas pipe 12 and the centerline of the internal cone 20 are generally parallel. The circumferences of both the exhaust gas pipe 12 and the internal cone 20 increase in the direction of exhaust gas flow. Alternatively, in the case where the exhaust gas pipe 12 is non-circular in cross-section, the cross-sectional surface area of both the exhaust gas pipe 12 and the internal cone 20 increase in the direction of exhaust gas flow. The internal cone 20 is installed a certain distance from the surrounding exhaust gas pipe 12. At an inlet 28, the passage 26 has a wider width "w1" than the width "w2" at the downstream end 24 of the internal cone 20.

The injector 14 is advantageously mounted to the exterior of the upstream end 16 of the exhaust pipe. The internal cone 20 advantageously extends through the upstream end 16 to the exterior of the exhaust pipe 12 where the upstream end 22 is attached to the nozzle 23 of the injector 14. It is contemplated that spacers can be used to position the internal cone 20, or that the connection of the internal cone at the upstream end 16 of the exhaust pipe 12 is sufficient to cantilever the internal cone in place.

Inside the exhaust gas pipe 12, exhaust gases 30 flow into the inlet 28 from a feeder pipe 32, along the passage 26 and towards an outlet 36. It is contemplated that the feeder pipe 32 can be connected to the inlet 28 of the exhaust pipe 12 in many different ways, however the feeder pipe is advantageously configured to provide exhaust gas flow 30 in a direction parallel with the centerline of the exhaust gas pipe 12. After flowing through the passage 26, the exhaust gases 30 then flow downstream of the outlet 36 to a catalyst 38. The portion of the aftertreatment system 10 between the feeder pipe 32 and the injector 14 on the upstream end, and the catalyst 38 on the downstream end, is the exhaust gas channel, indicated generally as 34, which includes the exhaust gas pipe 12 and the internal cone 20.

Near the upstream end 22 of the internal cone 20 is at least one opening 40 that permits the exhaust gases 30 to flow to the interior volume 42 of the internal cone. With the exhaust gases 30 flowing around and through the internal cone 20, the internal cone is heated to approximately the same temperature as the exhaust gases.

Advantageously, the internal cone 20 is made of a corrosion-resistant material, such as stainless steel, however other materials are contemplated. The internal cone 20 directs the spray of urea 17 from the injector 14 in a direction generally parallel with the exhaust pipe 12 to minimize or eliminate contact of the sprayed aqueous urea with the interior surface 16 of the exhaust pipe.

The at least one opening 40 maintains a dynamic control of pressure equilibrium inside of the internal cone 20, which dynamically changes the amount and direction of exhaust gas flow 30 through the internal cone, and increases a drag force on the urea or other reductant spray 17 droplets.

The drag force increases the travel time of the reductant spray 17 to the catalyst, which provides more time for the reductant to evaporate. The amount of drag force can be controlled by the relative size and shape of the internal cone 20 to the exhaust gas pipe 12, and the size and shape of the openings 40, which in turn controls the amount, velocity and direction of exhaust gas flow 30. The size of the passage 26 can be optimized with the relative size and shapes of internal cone 20, exhaust gas pipe 12 and openings 40 that maintains the lowest static pressure at an exterior side 44 of the openings 40 versus an interior side 46 of the openings 40 at various engine speeds and loading. Test results indicate that under some conditions, the exhaust gas flow 30 through the internal cone 20 can be reverted (flow in the opposite direction, from downstream end 24 to upstream end 22 of internal cone 20).

When the injector 14 sprays the urea solution 17 into the internal cone 20, the urea solution 17 is minimized or prevented from hitting the colder exhaust gas pipe 12 (which is surrounded by ambient air), and instead contacts the internal cone 20. Since the internal cone 20 is heated to the temperature of the exhaust gas 30, the urea solution can continue to evaporate. Additionally, since the urea solution 17 does not contact the exhaust gas pipe 12, the pipe can be made of less expensive steel or other less-corrosion resistant materials.

The urea or other reductant 17 is provided with a longer residence time in the exhaust gas flow 30. The result of the longer residence time in the exhaust gas flow 30 is that there is improved evaporation of the urea or other reductant 17, improved efficiency of the SCR system 10, reduced solid urea buildup, and reduced corrosion of the exhaust pipe 12. Additionally, the injector 14 can be located closer to the catalyst 38 than in some prior art systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for injection of a liquid reductant into an exhaust gas and for evaporating and decomposing the liquid reductant at an elevated temperature, the method comprising:
   providing an exhaust pipe having an interior surface and disposing the exhaust pipe in fluid communication with and upstream of a catalyst;
   disposing an internal cone within the exhaust pipe and disposed generally parallel to the exhaust pipe;
   mounting an injector to the exterior of the exhaust pipe and in fluid communication with the internal cone;
   injecting the liquid reductant into the internal cone;
   directing the exhaust gas in a passage between the interior surface of the exhaust pipe and the internal cone and directing the exhaust gas within the internal cone, the flow of exhaust gas having an elevated temperature compared to an ambient;
   creating a drag force on the injected liquid reductant to increase the travel time of the injected liquid reductant from the injector to the catalyst.

2. The method of claim 1 further comprising the step of evaporating and decomposing the liquid reductant before flowing to the catalyst.

3. The method of claim 2 further comprising the step of evaporating and decomposing the liquid reductant in the internal cone.

4. The method of claim 1 wherein the internal cone has at least one hole located near an upstream end of the cone.

5. The method of claim 1 wherein the exhaust pipe is generally cone-shaped.

6. The method of claim 5 wherein the circumference of the internal cone and the circumference of the exhaust pipe increase in the direction of flow of exhaust gas.

7. The method of claim 1 wherein the liquid reductant is an aqueous solution comprising urea or ammonia.

8. The method of claim 1 wherein the internal cone is made of a corrosion-resistant material.

9. The method of claim 1 further comprising the step of providing a feeder pipe to an inlet of the exhaust pipe to provide exhaust gas, wherein the feeder pipe is generally parallel to the exhaust pipe.

10. A system for use in injection of a liquid reductant into an exhaust gas and for evaporating and decomposing the liquid reductant at an elevated temperature, the system comprising:
    an exhaust pipe having an interior surface, the exhaust pipe being in fluid communication with and located upstream of a catalyst;
    an internal cone disposed within the exhaust pipe and disposed generally parallel to the exhaust pipe;
    an injector mounted to the exterior of the exhaust pipe and in fluid communication with the internal cone;
    a passage between the interior surface of the exhaust pipe and the internal cone configured to receive a flow of exhaust gas, the flow of exhaust gas having an elevated temperature compared to an ambient;
    at least one hole in the internal cone configured to permit the flow of exhaust gas into the internal cone for creating a drag force on the injected liquid reductant to increase the travel time of the injected liquid reductant from the injector to the catalyst.

11. The system of claim 10 wherein the liquid reductant is evaporated and decomposed before flowing to the catalyst.

12. The system of claim 11 wherein the liquid reductant is evaporated and decomposed in the internal cone.

13. The system of claim 10 wherein the exhaust pipe is generally cone-shaped.

14. The system of claim 13 wherein the circumference of the internal cone and the circumference of the exhaust pipe increase in the direction of flow of exhaust gas.

15. The system of claim 10 wherein the liquid reductant is an aqueous solution comprising urea or ammonia.

16. The system of claim 10 wherein the internal cone is made of a corrosion-resistant material.

17. The system of claim 10 further comprising a feeder pipe in fluid communication with an inlet of the exhaust pipe to provide exhaust gas, wherein the feeder pipe is generally parallel to the exhaust pipe.

18. An exhaust gas channel for an aftertreatment system of a vehicle, the exhaust gas channel being located between an injector on an upstream end, and a catalyst on a downstream end, the exhaust gas channel comprising:
    an exhaust pipe having an interior surface, the exhaust pipe being in fluid communication with and located upstream of the catalyst, the exhaust pipe having an increasing interior surface area in the direction of flow of exhaust gas;
    an internal cone disposed within the exhaust pipe and having an upstream end in sealed, fluid communication with the injector, and a downstream end in fluid communication with the exhaust pipe, the internal cone disposed generally parallel to the exhaust pipe and having an increasing interior surface area in the direction of flow of exhaust gas;
    a passage between the interior surface of the exhaust pipe and the internal cone configured to receive a flow of exhaust gas, the flow of exhaust gas having an elevated temperature compared to an ambient; and
    at least one hole located on the internal cone near the upstream end, the at least one hole configured to permit the flow of exhaust gases into the internal cone.

19. The exhaust gas channel of claim 18 wherein the internal cone is made of a corrosion-resistant material.

20. The exhaust gas channel of claim 18 wherein the at least one hole comprises a plurality of holes disposed around the circumference of the internal cone.

* * * * *